July 29, 1969 J. F. HUGHES, JR., ET AL 3,458,415
METHOD AND APPARATUS FOR THE TREATMENT OF LIQUIDS AND
LIQUID BORNE MINERALS AND GASES
Filed June 8, 1966
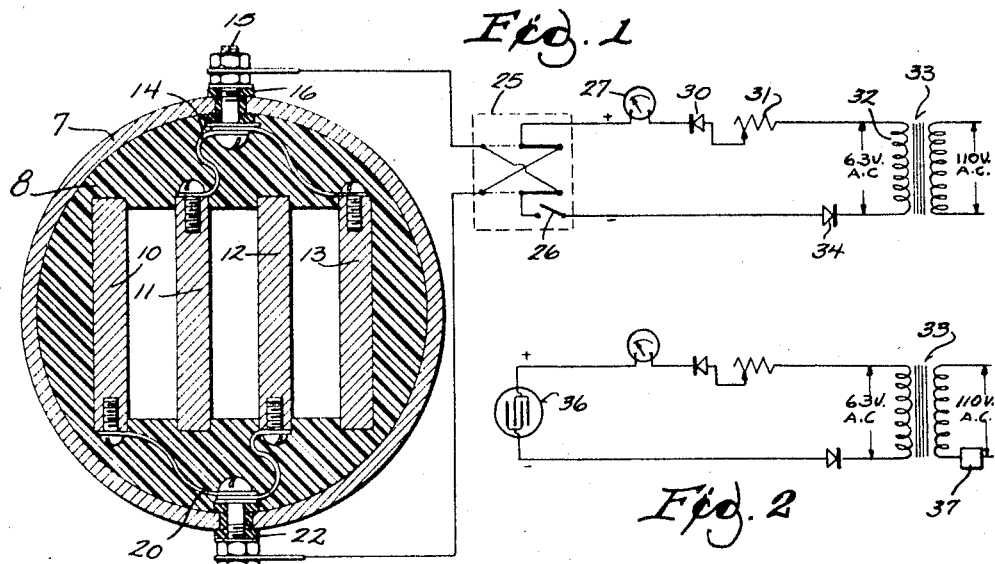
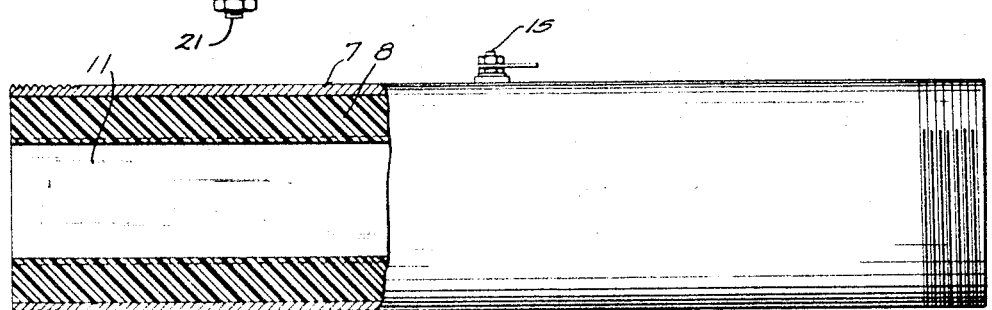
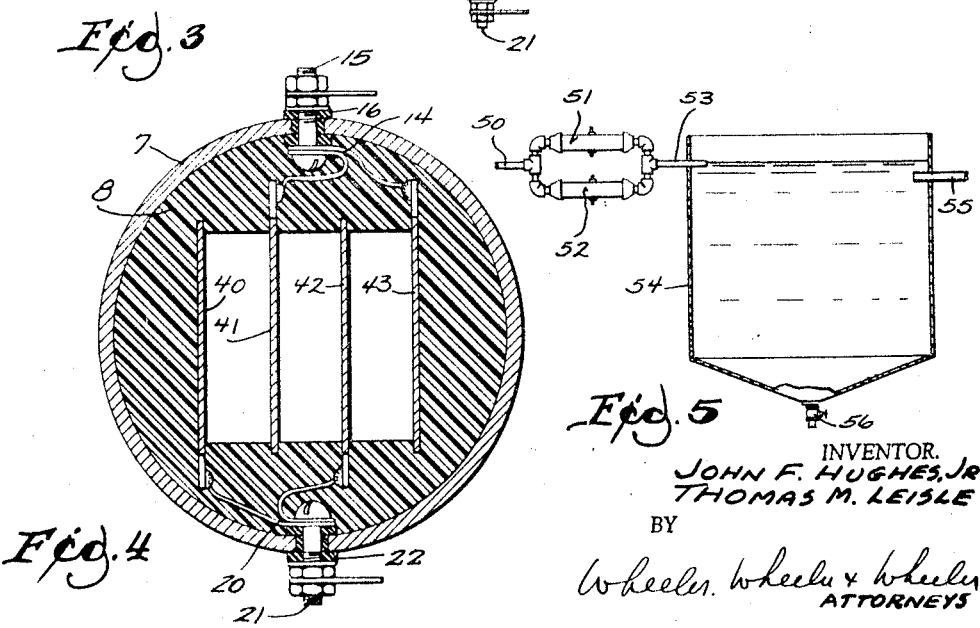
INVENTOR.
JOHN F. HUGHES, JR.
THOMAS M. LEISLE
BY
Wheeler, Wheeler & Wheeler
ATTORNEYS

United States Patent Office 3,458,415
Patented July 29, 1969

3,458,415
METHOD AND APPARATUS FOR THE TREATMENT OF LIQUIDS AND LIQUID BORNE MINERALS AND GASES
John F. Hughes, Jr., 3 Ligustrum Circle, and Thomas M. Leisle, 647 N. Beach St., both of Ormond Beach, Fla. 32074
Continuation-in-part of application Ser. No. 213,261, July 30, 1962. This application June 8, 1966, Ser. No. 560,978
Int. Cl. C23f *13/00;* C02b *1/82*
U.S. Cl. 204—149                         16 Claims

ABSTRACT OF THE DISCLOSURE

A method of treating an aqueous solution by electrically induced adsorption which comprises exposing said aqueous solution between spaced like adsorptive metal electrodes, said metal being selected from the transition groups of the Periodic Table, except iron, and being characterized by having electron vacancies in the *d* energy levels thereof, alloys thereof and alloys thereof with a minor amount of iron, and impressing a direct current potential of 0.013 to approximately 1.0 volt on a circuit including said electrodes, said electrodes being connected with opposite polarity. Preferred metals include chromium, nickel, tungsten, molybdenum and cobalt. It is advantageous to reverse the polarity of the electrodes from time to time.

---

This application is a continuation-in-part of application Ser. No. 213,261, filed July 30, 1962, now abandoned, which in turn is a divisional application of application Ser. No. 803,620, filed Apr. 2, 1959, now abandoned.

This invention relates to apparatus and a method for treating liquids and liquid borne gases and minerals for changing the heretofore expected effect of such gases and minerals in the liquid.

In our U.S. Patent 2,864,750 we disclose an apparatus and method for reducing the corrosion and scale-forming properties of gases and minerals in water and for removing scale already formed thereby, and involving the use of electrodes of different but particularly defined materials, to which direct current is applied at low potential and current, and means for reversing the applied E.M.F. in predetermined cycles so that differing and modified electrode interfaces are obtained.

We have now found that a generally similar apparatus and method can be used with like electrodes, i.e., either all "non-metallic conductor" electrodes or all "adsorptive metal" electrodes, the results differing from those disclosed in the patent as well as differing between the all non-metal and all metal electrode structures themselves. Thus, the all non-metallic electrode construction makes it possible to put the minerals into a form or condition in which they no longer have the effects which were heretofore known and expected but in which the appearance and some other physical properties of the solution are changed. Such changes are indicated by changes in pH, continuation of an increase in turbidity and suspended flocculation, and the appearance of the perhydroxyl ion, $HO_2^-$, as indicated by polarographic determination. The use of an all metallic electrode construction substantially reduces the effects of hardness in the solution. Such a change is indicated by changes in pH and by an increased clarity of the treated solution.

With all non-metallic electrodes the results indicate that gases contained in the solution are reduced, while with all metallic electrodes anions are reduced. Hence, the devices disclosed herein can be used for keeping the gases and minerals in solution in a form which changes their usual effects or the gases and minerals can be put into a form in which they can be mechanically removed from the solution. Thus, the non-metallic electrode device is particularly useful for the purification of exceedingly dilute solutions and for the recovery of valuable minerals from very dilute solutions. The changes in composition, such as between that of the original solution and the precipitates and liquid of the treated solution, can all be shown by standard chemical tests.

In the drawings:

FIGURE 1 is a cross-section through a device using all non-metallic electrodes only and to which direct current is supplied by an electric circuit which is schematically shown;

FIGURE 2 is a modified form of the electric supply circuit;

FIGURE 3 is a longitudinal section through the device of FIGURE 1;

FIGURE 4 is a view similar to FIGURE 1 but using all-metallic electrodes only. This view omits the electric circuit of FIGURE 1; and FIGURE 5 diagrammatically illustrates an installation using two of our units which are oppositely connected and are particularly effective for softening water of high hardness.

Referring to the drawings, numeral 7 designates a pipe-like outer shell which may be made of metal or non-metal, within which electrodes are held in place by any non-conductive material 8 inert to the solution to be treated and the gases contained therein and which can be cast or otherwise formed into place. Non-metallic electrodes 10, 11, 12 and 13 are held in the insulation 8 to co-act therewith in defining passages for the flow of solution therethrough. The electrodes in the units herein disclosed, for treatment of flow in lines of up to, for example, two inches in diameter, are spaced to bring their opposite surfaces approximately ½ inch apart, but the spacing of the electrodes in other size units may be different. The resistance and character of the solution are also considerations in determining this spacing. The electrodes 11 and 13 are both connected to the one side of a D.C. supply circuit by a connector 14 and a terminal 15 passing through insulation 16 in an aperture in the pipe 7, which may be selected to be either the anode or the cathode in the system. Electrodes 10 and 12 are joined to the supply circuit by connector 20 and terminal 21 extending through insulation 22 in an aperture through the pipe 7, and form the other side of the system.

Terminals 15 and 21 are connected through a circuit reversing timer 25 having a cut-off switch 26 and through a microammeter 27 which may be placed in the system only at the time of initial adjustment of the system for operation and when operation is to be checked or it may be left permanently in the system. A half-wave rectifier 30 and a variable resistor 31 (either inductive or non-inductive) of 500,000 ohms are connected to one terminal of a secondary winding 32 of a transformer generally designated as 33, which receives alternating current at 110–120 v. and reduces the potential to approximately 6.3 v. at the secondary winding terminals. Terminal 21 is connected through another half-wave rectifier 34 to another terminal of secondary winding 32. Of course, other sources of direct current may be used to provide the necessary values of potential and current.

The circuit in FIGURE 2 is another means for impressing voltage on our unit but without breaking the D.C. circuit connections, the A.C. circuit being interrupted and thereby reversing the polarity of the electrodes electrolytically. This unit is diagrammatically indicated at 36. The timer 25, 26 of FIGURE 1 is omitted and a different timer 37 is placed in the primary winding connections of transformer 33. The timer 37 does not have a reversing switch but operates only a disconnect switch so that the A.C. circuit may be interrupted.

The structure shown in FIGURE 4 is similar to that above described except that metallic electrodes 40, 41, 42 and 43 are employed. Again, two of the electrodes are interconnected and connected to the positive side of the electric supply circuit and two electrodes are connected to the negative side of the circuit. It will be obvious that either of the devices may contain any number of electrodes required to define a sufficient number of passages at the desired spacing of the plates for the flow of the desired amount of the solution, it being necessary only that an anode and a cathode be placed in opposite positions for the flow of solution in contact therewith.

Any combination of the units described herein and the unit described in our earlier patent may be used in the combination shown in FIGURE 5, particularly for softening hard water. A water supply line 50 is connected with units 51 and 52 arranged in parallel, and the units discharge into a common line 53. The water is discharged into settling tank 54 adjacent to the top of the tank and in such a way as to cause a minimum of disturbance in the water already in the tank, and the water is drawn off by way of a pipe 55 slightly below the level of the pipe 53. The tank preferably has a conical bottom with a valve 56 by which the precipitation is drawn off, the same being in the form of a heavy sludge. Obviously other mechanical separating devices can be used.

The non-metallic adsorptive electrode materials employed are those metalloids which are electric conductors, are non-ionizable in solution and are capable of absorbing considerable amounts of gases and other substances. In both our previous patent and in this disclosure, we refer to this material as a "non-metallic conductor." It is preferable to use a carbonaceous type of material, and, more particularly, carbon therefor. The metallic electrodes are made of the metals of the transition groups of the Periodic Table which are characterized by incomplete inner energy levels ($d$ electrons) and unfilled $d$ energy bands, or an alloy containing such a metal. It is preferable that the metallic electrodes be non-magnetic. In our earlier patent and in this disclosure, we refer to this material as "adsorptive metal." Preferred examples of such metals include chromium, nickel, cobalt, molybdenum and tungsten, but not iron, which, due to its ability to ionize in two forms, divalent and trivalent, must be alloyed with other transition metals, such as chromium and nickel, in order to obtain the desired state of "adsorptiveness." The ability to adsorb oxygen on the metallic interface rather than form a reaction product is the test of an operative metal. Accordingly, electrodes made of these materials have the ability to adsorb substantial quantities of gases and other substances and the use thereof in the present invention, which is basically as an ion exchange device, is to be distinguished from the ordinary electrochemical process wherein potentials large enough to decompose water are employed. The pipe used in conjunction therewith in the present invention is preferably made of iron.

We have found that the desired results of the present invention are obtained when voltages are applied which range from 0.013 to approximately 1.0 volt. The water from the city water supply of Jacksonville, Fla., has been effectively treated at 0.52 v. while 0.5 v. has been used in treating the water supplied by the city of Daytona Beach, Fla. The amount of electric current supplied depends upon the particular solution to be treated and the particular result desired, i.e., whether it is desired to retain the minerals in the liquid and to merely change their properties, as when treated water is to be used both for drinking and rinsing glassware which is to be air-dried without spots, or whether the minerals are to be actually removed from the liquids. Thus, for units passing sufficient water to fill a 1″ discharge line, we have successfully used more than 200 $\mu$a. with all non-metal electrodes, 20 $\mu$a. with all metal electrodes at Daytona Beach, Fla., and over 500 $\mu$a. in a unit containing both non-metallic and metallic electrodes for treating the water in a 3 inch supply line at Atlantic Beach, Fla.

In use, our all non-metallic electrode units convert some of the minerals in the aqueous solutions into oxalates, some of which are visible in the water thereby making the water turbid. Chemical analysis shows that the gas content thereof, particularly $CO_2$ and $O_2$, decreases and polarographic analysis shows the presence of the perhydroxyl ion, $HO_2-$. When the applied E.M.F. is removed in such a way as to eliminate the impressed potential and the external connection between the electrodes is removed, so that the charge that a voltmeter or ammeter indicates is built up between the electrodes is not drained off through the external circuit, the turbidity-causing mineral oxalates precipitate leaving the liquid clear. When all metallic electrodes are used, some of the anions are reduced, e.g., the bicarbonate anion to the bipercarbonate anion, which, when it combines with a calcium or iron cation, is in such a highly solvated form that the liquid becomes and remains clear. In both units described herein and in the unit described in our previous patent, some dissolved gases in the water, such as oxygen, carbon dioxide and hydrogen sulfide, are changed or eliminated so that all of our described units may be used as a simpler means of treating gaseous water than the means heretofore used for that purpose.

When a unit is put into service, the polarity is cycled back and forth so that the adsorbed substances may be modified by oxidation and reduction in order to provide the most efficient condition at the electrode interfaces. When the current is applied to a unit, a layer of oxygen accumulates on the anode. After sufficient time has elapsed so that the oxygen layer becomes substantially complete, the electric connections are reversed and the anode then becomes the cathode and vice-versa so that the oxygen is adsorbed thereto. The adsorbing action is instantaneous so far as we have been able to determine and the unit now continues to produce the desired results. When the adsorbed oxygen on the cathode diminishes, the unit gradually becomes less effective as the adsorbed oxygen is utilized. However, while the adsorbed oxygen on the cathode is being used up, a layer of oxygen is accumulated on the then anode so that the reversal of connections for reversing the polarity of the electrodes again causes adsorption of the oxygen accumulated on the then cathode and the device remains in operation except for the negligible time during which the connections are being changed. All of our units must have periodic reversals of polarity to remain effective. However, to maintain continuity of results, the electrodes must be made of the same material, either all metallic or all non-metallic, which differentiates the results obtained from the units disclosed herein from the results obtainable from the unit described in our prior patent.

Scale deposited prior to the use of our units is gradually removed after they are put into operation and no further scale is found to be formed thereafter. In one water system, scale was progressively removed in excess of two miles downstream from the unit. In this system, flushing operations were required from time to time at progressively greater distances from the unit.

In addition, it has been found that our units produce a coating over even corroded metal in the distribution system and which is "cathodic" in nature, i.e., negative in character with respect to the surface upon which it deposits, and such a coating deposits because of surface electron attraction. The coating is very thin and is barely visible and feels slippery (soapy) when wet. When dry, the coating has a whitish color and is somewhat powdery like calcimine. Experience shows that this coating inhibits the corrosion of metals and that the continued deterioration of already corroded spots is retarded.

The use of two units in parallel as shown in FIGURE 5 is effective in softening water, for example, water of 200 p.p.m. hardness. The minerals producing the water hardness continuously precipitate as the output from the two units is mixed and the precipitates settle in the tank from which supernatant clear water is drawn. It is preferred that the tank be constructed in a manner that the water enters in such a way as to cause a minimum of turbulence in the tank and that the precipitates can be drawn off without disturbing the settling action in the upper portions of the tank.

We have found that the results discussed above are obtained when two of the units shown in our Patent 2,864,750 are connected with opposite polarity.

When the units described in the present application are employed in parallel, the results depend upon the combination of units used and the manner of operating them but are best illustrated by examples of various combinations. With two units each having all non-metallic electrodes, turbid water is obtained with the minerals precipitated in the water as oxalates and a water-softening effect is noted. However, when the circuit to one of such all non-metallic electrode units is interrupted, a water mixture is obtained from the two units which is less turbid and is substantially softer. With two units each having all metallic electrodes, a clear water mixture is obtained, the minerals being in a highly solvated condition, but only a limited softening effect is noted. But when the circuit to one of the all metal units is interrupted, the mixture of the water has a light precipitate of oxalates and carbonates.

With two units severally having all non-metal electrodes and all metal electrodes, a water mixture is obtained which is substantially softened and is somewhat turbid. When the circuit to the all-metal electrode unit is interrupted, a substantial softening effect is obtained and the water mixture is somewhat turbid. But when the circuit to the all-non-metal unit is interrupted, a clear water mixture is obtained with some softening and some softening effect. The combination of units used depends upon the $CO_2$ content in the aqueous solution and upon the amount of bicarbonates and calcium and magnesium salts present, the non-metallic electrode unit being more effective in utilizing the $CO_2$ content and the all-metallic electrode unit being more effective in converting the anions in the water.

The all non-metallic electrode units are more effective than the other units in dissipating gases dissolved in the liquid while the conversion of anions is more effectively accomplished with the all metal electrode units than by the other units. In all cases, a pH change occurs which varies from 4.6 to 9.6, indicating that chemical reactions are obviously taking place.

In all cases, the end results of such reactions are identifiable by standard chemical tests even though the physical properties of the solution remain unchanged in some operations.

There is a marked difference in the results obtained from the use of the metal electrodes made of adsorptive metal as contrasted with the all non-metallic conductor electrodes. The adsorptive metal electrodes produce a highly solvated mineral which tends to remain in solution, leaving the water non-turbid. On the other hand, with the all non-metal electrodes, for instance, the mineral content of the water tends to remain in suspension and the treated water is then turbid.

Therefore, there are differences in the manner in which the cycles of operation of the respective units can be controlled. If the electrodes are all metal, an instantaneous reversal of polarity of the respective electrodes can be used for control, or, by breaking the circuit, precipitation of the solvated substances can be obtained, and the precipitation will be in the form of oxalates and carbonates. If the electrodes are non-metallic, a short period of open circuit can be interposed at which time, for certain mineral contents of the water being treated, there is a precipitation of solids as oxalates, during the time in which the circuit is open.

In another instance, where iron is present along with other minerals such as calcium in one of its many compounds, the "off" or open circuit position, after a period of circuit closed operation, will result in the precipitation of the iron.

Successful softening of water is also attainable through the use of the unit described in our earlier patent in a system and process in which a quantity of water is treated and then segregated (separated). The unit is then reversed as to its polarity and the treatment is continued with another quantity of water. This latter quantity is then mixed with the segregated water. As these differently treated waters are mixed, softening takes place and precipitation gradually occurs.

Softening effects can also be obtained by using units having the all adsorptive metal electrodes described hereinabove, or by using units having the described all non-metallic conductor electrodes by operating at one polarity, reversing the polarity for a period of time and then adding a period of open circuit. Precipitation from the mixture of waters from the all metal units is from a clear solution; whereas, the precipitation from the all non-metallic units is from a turbid solution.

The invention being thus described, it will be obvious that the same may be varied in many ways. Such variations are not to be regarded as a departure from the spirit and scope of the invention and all such modifications are intended to be included within the scope of the following claims.

We claim:

1. A method of treating an aqueous solution which comprises exposing said aqueous solution between spaced like adsorptive metal electrodes, said metal being selected from the metals in the transition groups of the Periodic Table which have electron vacancies in the inner $d$ energy levels thereof, except iron, oxygen-adsorptive alloys of said metals and oxygen-adsorptive alloys of said metals with iron, and impressing a direct current potential of 0.013 to approximately 1.0 volt on a circuit including said electrodes, said electrodes being connected with opposite polarity.

2. The method of claim 1, wherein the polarity of said electrodes is reversed after a period of treatment at the previous polarity.

3. The method of claim 1, wherein the polarity of said electrodes is reversed in repetitive cycles.

4. The method of claim 1, including the steps of breaking said circuit, reversing the polarity of said electrodes and re-establishing said current potential, said steps being carried out in repetitive cycles.

5. The method of claim 1, wherein said current potential is impressed on said circuit for a period of time, the polarity of said electrodes is reversed and said current potential impressed thereon for a period of time, and then the circuit is opened for a period of time.

6. The method of claim 1, wherein said direct current potential is about 0.5 volt.

7. The method of claim 1, wherein said metal is selected from the group consisting of chromium, nickel, tungsten, molybdenum and cobalt.

8. A method of softening water which comprises exposing said water between spaced like adsorptive metal electrodes, said metal being selected from the metals in the transition groups of the Periodic Table which have electron vacancies in the inner $d$ energy levels thereof, except iron, oxygen-adsorptive alloys of said metals and oxygen-adsorptive alloys of said metals with iron, impressing a direct current potential of 0.013 to approximately 1.0 volt on a circuit including said electrodes, said electrodes being connected with opposite polarity, and mechanically removing the resultant precipitation from the treated water.

9. The method of claim 8, wherein the polarity of said electrodes is reversed after a period of treatment at the previous polarity.

10. The method of claim 8, wherein the polarity of said electrodes is reversed in repetitive cycles.

11. The method of claim 8, wherein said circuit is broken and then the resultant precipitation is mechanically removed from the treated water.

12. The method of claim 8, wherein said direct current potential is about 0.5 volt and said metal is selected from the group consisting chromium, nickel, tungsten, molybdenum and cobalt.

13. A method of demineralizing a mineral bearing aqueous solution which comprises exposing a first quantity of said aqueous solution between spaced like adsorptive metal electrodes, said metal being selected from the metals in the transition groups of the Periodic Table which have electron vacancies in the inner $d$ energy levels thereof, except iron, oxygen-adsorptive alloys of said metals and oxygen-adsoprtive alloys of said metals with iron, impressing a direct current potential of 0.013 to approximately 1.0 volt on a circuit including said electrodes, said electrodes being connected with opposite polarity, separating the treated aqueous solution, reversing the polarity of said electrodes, exposing a second quantity of said aqueous solution between said spaced like adsorptive metal electrodes, impressing a direct current potential of 0.013 to approximately 1.0 volt on a circuit including said electrodes, and finally mixing the thusly treated first and second quantities of aqueous solution.

14. A method of forming a coating on a surface wetted by a mineral bearing aqueous solution which comprises exposing said aqueous solution between spaced like adsorptive metal electrodes, said metal being selected from the metals in the transition groups of the Periodic Table which have electron vacancies in the inner $d$ energy levels thereof, except iron, oxygen-adsorptive alloys of said metals and oxygen-adsorptive alloys of said metals with iron and impressing a direct current potential of 0.013 to approximately 1.0 volt on a circuit including said electrodes, said electrodes being connected with opposite polarity.

15. A method for treating an aqueous solution which comprises exposing said aqueous solution between spaced like adsorptive metal electrodes, said metal being selected from the group consisting of chromium, nickel, tungsten, molybdenum and cobalt, and impressing a direct current potential of 0.013 to approximately 1.0 volt on a circuit including said electrodes, said electrodes being connected with opposite polarity.

16. The method of claim 15, wherein the polarity of said electrodes is reversed after a period of treatment at the previous polarity.

References Cited

UNITED STATES PATENTS 1,427,171  8/1922  Smith _____ 204—242

FOREIGN PATENTS 397,941  9/1933  Great Britain.
450,594  7/1936  Great Britain.

OTHER REFERENCES

Nordell: "Water Treatment," 2nd edition, Reinhold Publishing Corp. (1961), p. 51.

Eliassen and Uhlig: Journal Amer. Water Works Assoc., 44, July 1952, pp. 576–582.

Hurley et al.: Journal Inst. of Water Engineers, 1951, 5 pp., 686, 687, 688, 698 and 699.

Moore: "Phys. Chem.," 3rd edition, Prentice-Hall Inc., 1965, p. 503.

Monet: "Adsorption, Ion Exchange, and Dialysis," Chem. Engin. Progress Symposium Series, Amer. Inst. of Chem. Engin., vol. 55, 1959, No. 24, p. 3.

JOHN H. MACK, Primary Examiner

A. C. PRESCOTT, Assistant Examiner

U.S. Cl. X.R.

204—147, 196